Dec. 3, 1929. C. J. McCABE ET AL Re. 17,514

POCKETBOOK TOP

Original Filed July 11, 1929

Inventors
CHARLES J. McCABE,
IRVING SCHOENHOLZ,
By William S. Hurt
Attorney

Reissued Dec. 3, 1929 Re. 17,514

UNITED STATES PATENT OFFICE

CHARLES J. McCABE, OF BROOKLYN, AND IRVING SCHOENHOLZ, OF CEDARHURST, NEW YORK, ASSIGNORS TO McCABE AND SCHOENHOLZ, INC., OF NEW YORK, N. Y., A CORPORATION OF NEW YORK

POCKETBOOK TOP

Original No. 1,729,599, dated September 24, 1929, Serial No. 377,374, filed July 11, 1929. Application for reissue filed October 12, 1929. Serial No. 399,359.

Our present invention relates generally to hand bags, and more particularly to the frame and locking arrangement thereof.

One of the objects of our invention is the provision of a frame and locking structure which will enable the production of handbags more quickly and more economically.

Another object of our invention is the provision of a handbag structure possessing advantages from the standpoint of fullness of contour and increase in width at the frame opening.

For the attainment of the foregoing objects and such other objects as may hereinafter appear or be pointed out, we have illustrated one embodiment of our invention in the accompanying drawings wherein—

Figure 1:
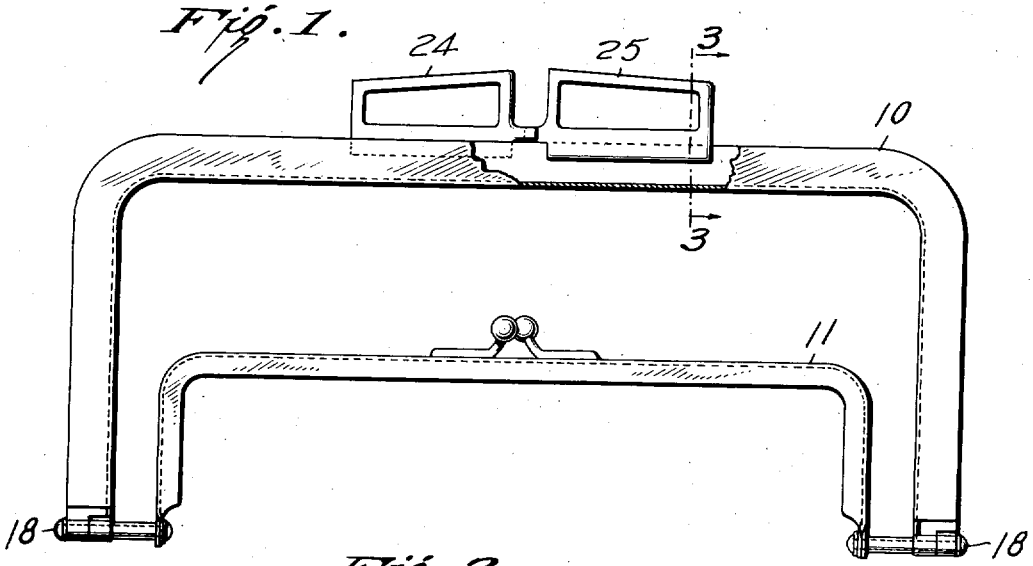
Figure 1 is a front elevational view of our frame.

Upon viewing the drawing of Figure 1, it will be observed that our invention is illustrated as embodied in a frame structure adapted to provide a handbag having an inner compartment and an outer compartment because our invention serves certain advantages in connection with such a frame.

Figure 2:
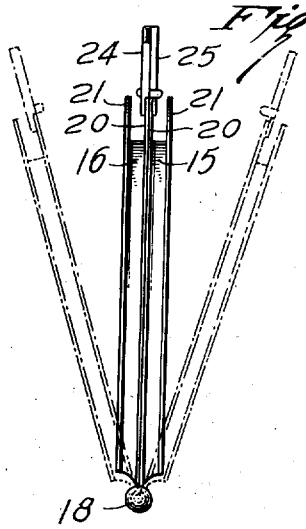
Figure 2 is a side elevational view thereof in closed position, the dotted lines showing the frame structure in open position.
Figure 3:
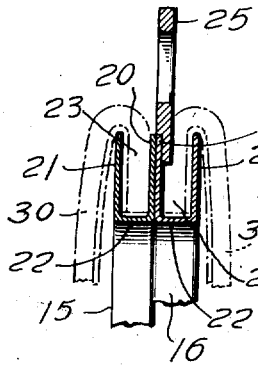
Figure 3 is an enlarged cross-sectional view taken on lines 3—3 of Figure 1 with the handbag fabric shown in dotted lines.
Figure 4:
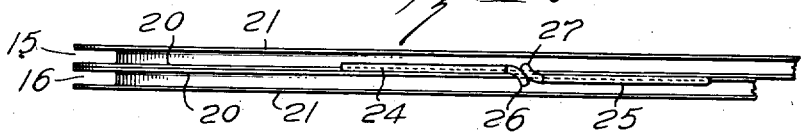
Figure 4 is a top plan elevation looking down upon the frame of Figure 1.

The reference character 10 is applied in Figure 1, to the main or outer frame and reference character 11, to the inner frame. The frame 10, as shown more clearly in Figures 2, 3 and 4, comprises the members 15 and 16, each generally U-shaped and pivoted at the free ends of the legs of the U to the aligned pins 18. Each of the frame members 15 and 16 of the main frame is preferably, although not necessarily in the form of a metal stamping, and U-shaped in cross-section as shown more clearly in Figure 3 to provide inner and outer upstanding walls 20 and 21, and a bottom 22. The channel 23, formed in each frame between these walls and bottom, it will be observed, extend upwardly and outwardly for purposes that will be hereinafter more fully pointed out.

Secured to the inner wall 20, of the channel 23, in each of these frame members 15 and 16 and at a point substantially midway of the connecting web of the U is an upstanding member 24 or 25, provided with inter-engaging camming portions 26 and 27 disposed upwardly from one of the walls to add resiliency to the locking members and to serve as a spring lock for holding the two frame member in the well known manner. The application of pressure to the members 24 and 25 in opposite directions will cause the members 26 and 27 to spring past each other either in opening or closing the frame, 10.

The inner frame structure 11, is formed of two frame members, also each generally in the form of a U and also each pivoted at the free ends of the legs of the U on the aligned pins 18, which pins are made sufficiently long to serve as bearings for the legs of both frames.

The members 24 and 25, are each illustrated in the drawings as in the form of open frames, the advantage of which will be well understood.

In the manufacture of the bag, the bag material (see 30 of Figure 5) is caused at its upper end to engage about the outer surface and over the top of the outer walls 21 of the channels 23, of the outer frame member and the free upper edges of the bag material is forced or passed into the channels 23 and secured therein in any desired or preferred manner. The arrangement of the locking members 24 and 25, due to the fact that they are carried from the inner walls 20 of the channels 23, is such that the bag material can be secured in position in the simple, economical, efficient and labor saving manner set forth and in addition covers those metallic portions of the outer frame which ordinarily are exposed to view.

The inner frame, 11, is, as already set forth, of the more or less conventional type and the fabric is secured thereto in any desired or preferred manner, to form the inner container of the handbag and as the manner of the construction of the inner pocket has no bearing upon our invention, no further description thereof is believed to be necessary.

Figure 5:
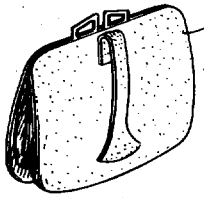
Figure 5 is a perspective view of the bag employing the frame of Figure 1.

In Figure 5, of the drawing, we have shown in perspective a finished handbag employing the frame structure of Figure 1 and it will be understood from the description of the construction of the outer frame members 15 and 16, and of the manner in which the material of the outer bag is associated therewith, and of the relationship thereto of the position of the locking members 24 and 25, that the bag as a whole is given a changed outer contour and that the mouth of the bag is wider than is the case in connection with the type of the bag hitherto constructed.

Having thus described our invention and illustrated its use, what we claim as new and desire to secure by Letters Patent is—

1. A handbag frame comprising U-shaped members hinged to each other at the free ends of the legs of the U, each member being channeled inwardly to provide spaced inner and outer walls extending upwardly and outwardly, whereby the upper and outer ends of the handbag fabric can be passed over the outer surfaces of the outer walls of the channels and over the top edges of such walls and secured in position in such channel, and means for holding said frame members against separation, said means comprising camming locking members carried by the said inner walls and independent of the securing means for the handbag fabric whereby the channels are maintained substantially unobstructed and said inner walls add to the resiliency of the locking members.

2. A handbag frame comprising U-shaped members hinged to each other at the free ends of the legs of the U, each member being channeled inwardly to provide spaced inner and outer walls extending upwardly and outwardly, whereby the upper and outer ends of the handbag fabric can be passed over the outer surfaces of the outer walls of the channels and over the top edges of such walls, and secured in position in such channels, and means for securing said frame members against separation, said means comprising camming locking members mounted on the said inner walls and extending upwardly substantially in the plane thereof whereby the handbag fabric can be readily engaged in said channels and secured therein independently of said securing members whereby the channels are maintained substantially unobstructed and said inner walls add to the resiliency of the locking members.

3. A handbag comprising a frame made up of U-shaped members hinged to each other at the free ends of the legs of the U, each member being channeled inwardly to provide spaced inner and outer walls extending upwardly and outwardly, means for securing said frame members against separation comprising camming locking members extending upwardly from the upper edges of the inner walls, and handbag fabric passed over the upper edges of and about the outer walls and secured in the channels independently of said securing members whereby the channels are maintained substantially unobstructed and said inner walls add to the resiliency of the locking members.

4. A handbag frame comprising U-shaped members hinged to each other at the free ends of the legs of the U, each member being channeled inwardly to provide spaced inner and outer walls extending upwardly and outwardly, whereby the upper and outer ends of the handbag fabric can be passed over the outer surfaces of the outer walls of the channels and over the top edges of such walls and secured in position in such channels, and means for holding said frame members against separation, said means comprising camming locking members each carried by one of the two walls defining each channel and independently of the securing means for the handbag fabric whereby the channels are maintained substantially unobstructed and said last mentioned walls serve as the resilient mountings for the camming locking members.

5. A handbag comprising a frame made up of U-shaped members hinged to each other at the free ends of the legs of the U, each member being channeled inwardly to provide spaced inner and outer walls extending upwardly and outwardly, means for securing said frame members against separation comprising camming locking members each carried by and extending upwardly beyond the upper edges of one of the two walls defining each channel, and handbag fabric passed over the upper edges of and about the outer walls and secured in the channels independently of said securing members whereby the channel is maintained substantially unobstructed and said last mentioned walls add resiliency to the camming locking members.

In testimony whereof we affix our signatures.

CHARLES J. McCABE.
IRVING SCHOENHOLZ.